(12) United States Patent
Miura et al.

(10) Patent No.: US 8,286,758 B2
(45) Date of Patent: Oct. 16, 2012

(54) DISK BRAKE

(75) Inventors: Yorihito Miura, Minami Alps (JP); Shinichi Nakayama, Kofu (JP); Shigeru Hayashi, Minami Alps (JP); Katsuhiro Takahashi, Minami Alps (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 152 days.

(21) Appl. No.: 12/870,090

(22) Filed: Aug. 27, 2010

(65) Prior Publication Data

US 2011/0048872 A1    Mar. 3, 2011

(30) Foreign Application Priority Data

Aug. 31, 2009  (JP) ................................ 2009-200990

(51) Int. Cl.
*F16D 65/56* (2006.01)

(52) U.S. Cl. ..................................... 188/71.9; 188/72.8

(58) Field of Classification Search .................. 188/71.7, 188/71.8, 71.9, 72.7, 72.8, 72.9
See application file for complete search history.

(56) References Cited

U.S. PATENT DOCUMENTS

| 6,651,784 | B1 * | 11/2003 | Barbosa et al. | 188/71.9 |
| 6,811,002 | B2 | 11/2004 | Nakayama et al. | |
| 2011/0155520 | A1 * | 6/2011 | Takahashi et al. | 188/72.6 |
| 2011/0290597 | A1 * | 12/2011 | Miura et al. | 188/72.4 |

FOREIGN PATENT DOCUMENTS

JP    2004-286202    10/2004

* cited by examiner

*Primary Examiner* — Christopher Schwartz
(74) *Attorney, Agent, or Firm* — Wenderoth, Lind & Ponack, LLP

(57) ABSTRACT

A disk brake capable of improving fabrication efficiency and having a transmission member. The transmission member (101) includes: an anti-rotation locking portion (130) formed on an outer circumferential portion of the transmission member, the anti-rotation locking portion being slidably fitted into a fitting area (72) on a cylinder (35) side so as to restrict rotation relative to the cylinder; and a seal groove (109) formed in an inserted portion (105). The seal groove stores a sealing member (118) for defining an internal space in the cylinder (35) and a cam chamber (62). The anti-rotation locking portion is fitted into the fitting area (72) on the cylinder side before the sealing member is positioned inside a hole (59) when the inserted portion (105) of the transmission member (101) is inserted into the hole.

20 Claims, 10 Drawing Sheets

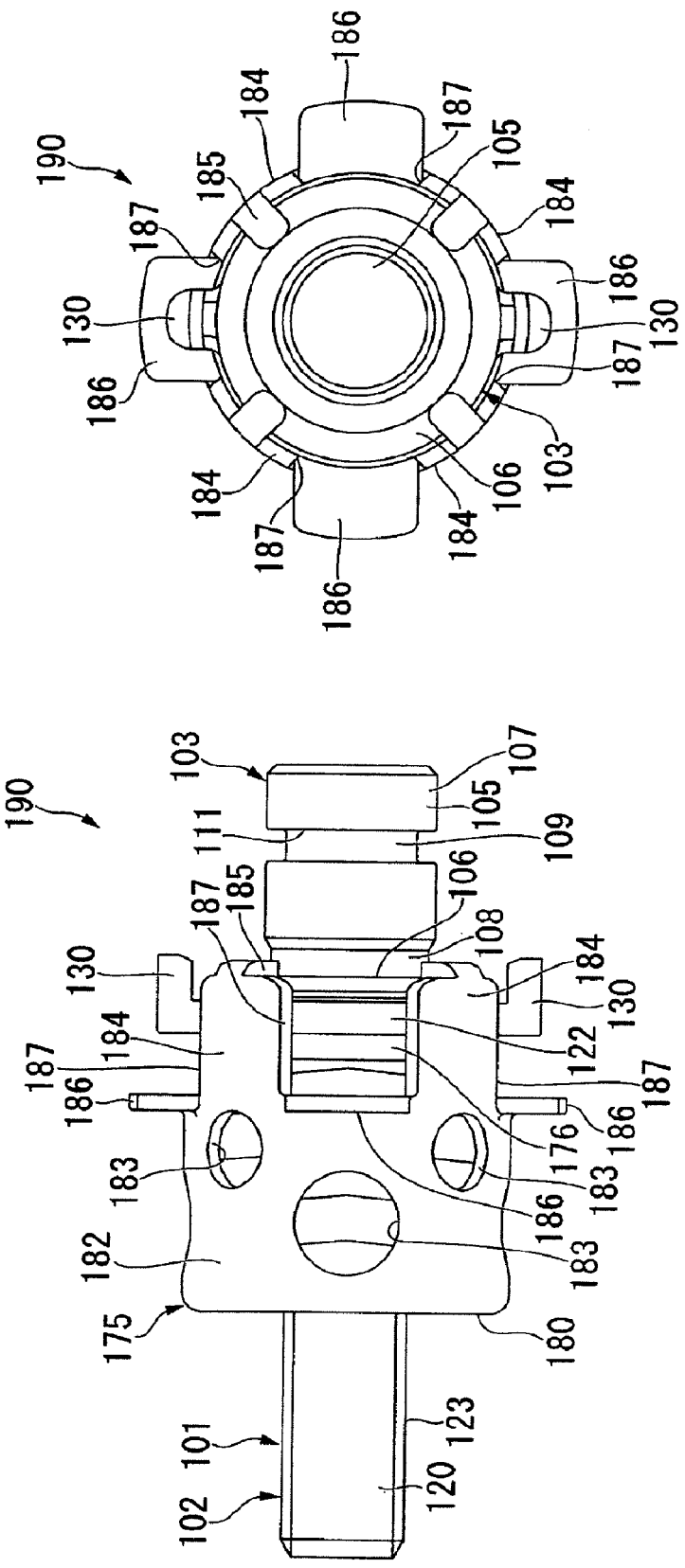

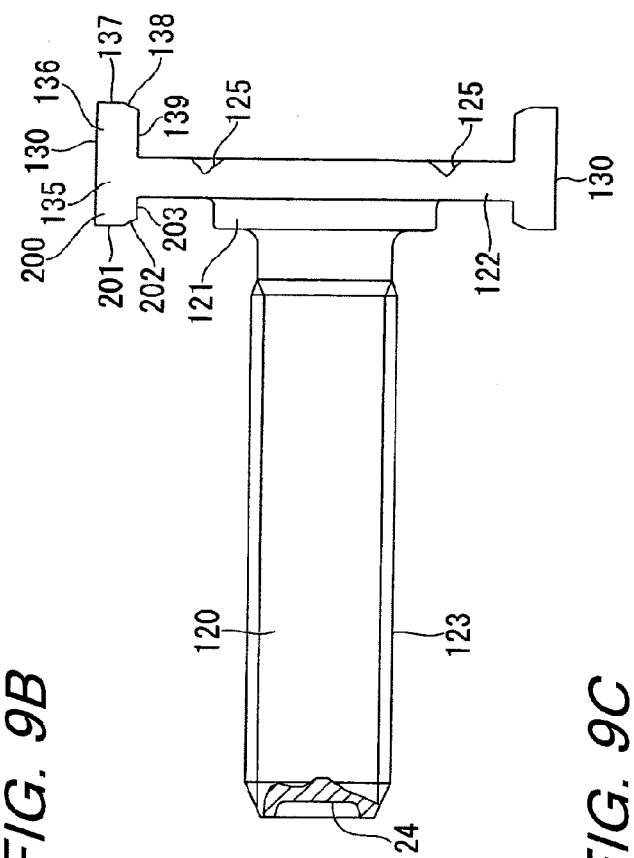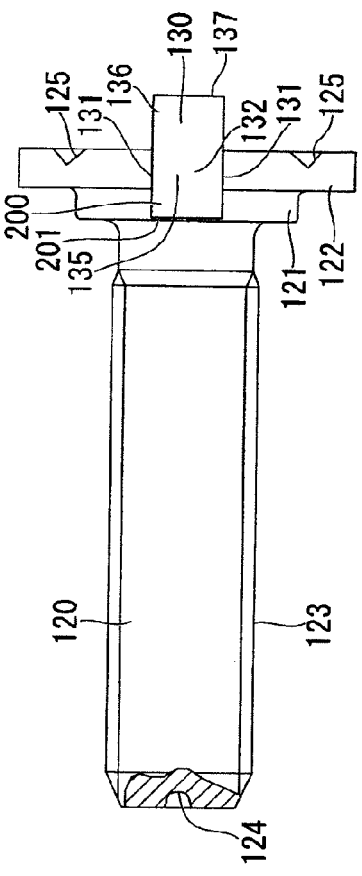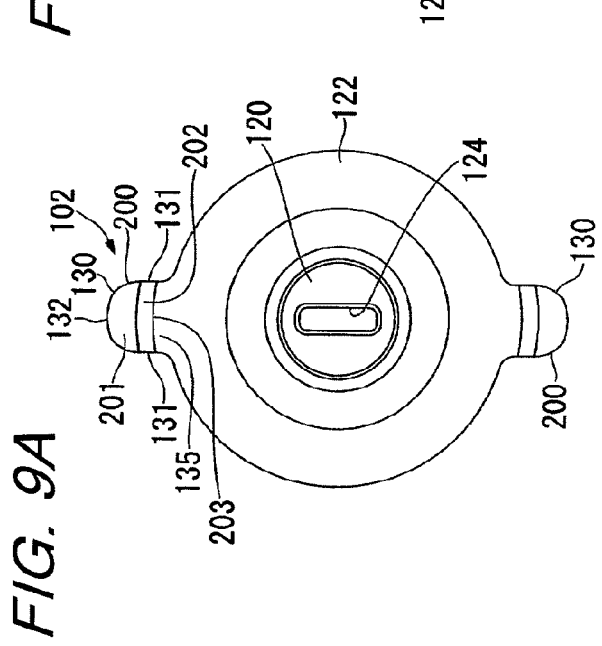
FIG. 9B
FIG. 9C
FIG. 9A

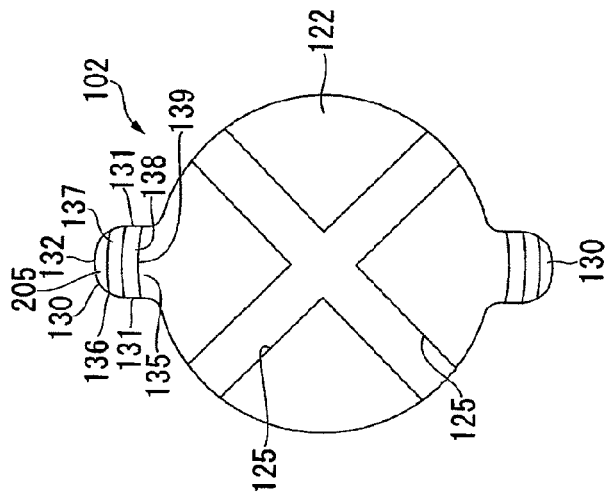
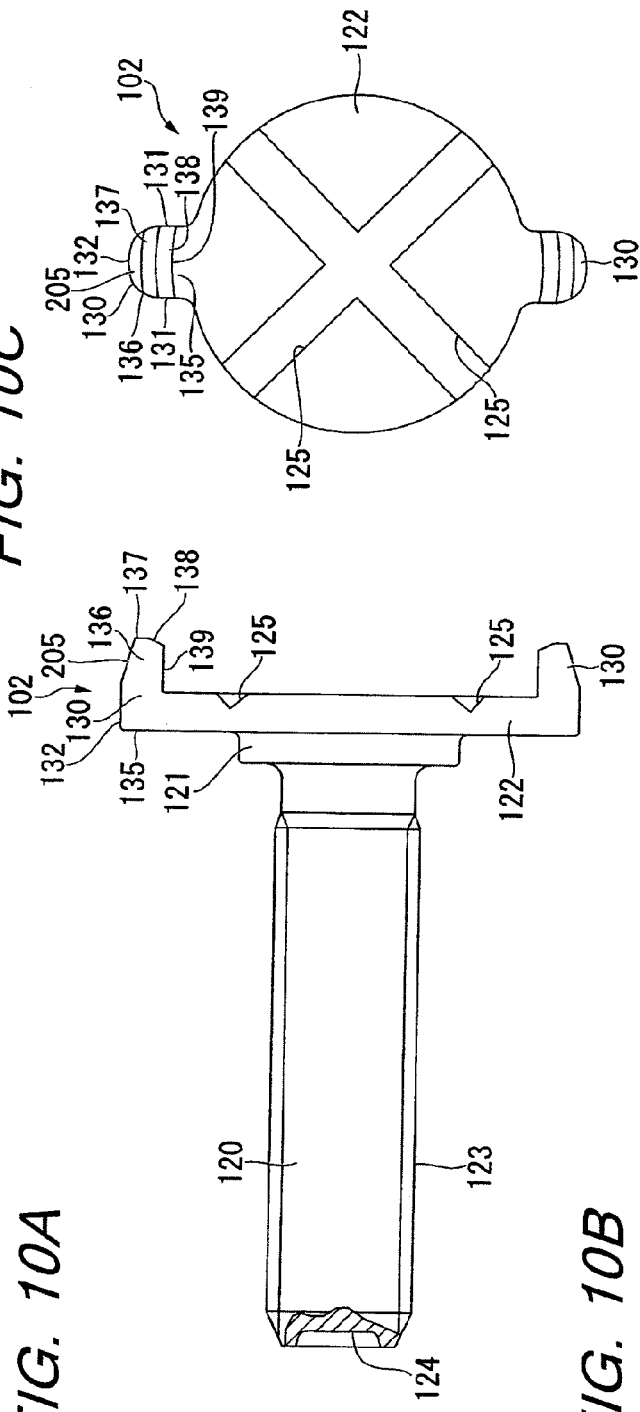
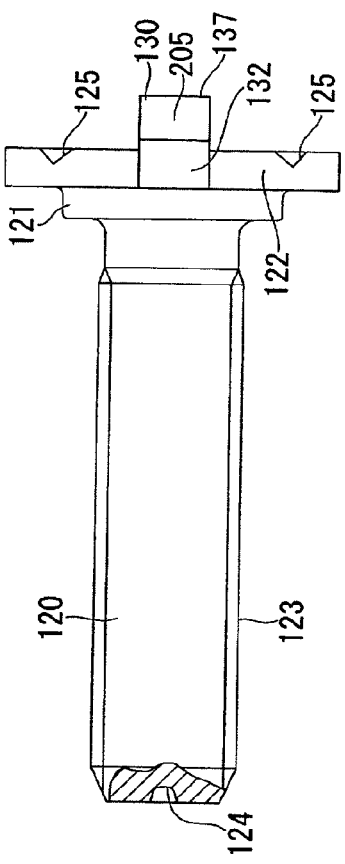

DISK BRAKE

BACKGROUND OF THE INVENTION

The present invention relates to a disk brake.

There is known a disk brake with a parking brake, in which a transmission member is pressed by a cam mechanism to thrust a piston (for example, see Japanese Patent Application Laid-open No. 2004-286202).

SUMMARY OF THE INVENTION

In a structure in which a transmission member is locked against rotation relative to a cylinder, if a cam chamber which houses a cam mechanism therein is sealed with a seal provided to the transmission member at the time of incorporation of the transmission member into the cylinder, the fitting for anti-rotation locking between the transmission member and the cylinder is sometimes released by return of the transmission member to a cylinder opening side due to an air pressure in the cam chamber even though the transmission member is temporarily pressed in. As a result of the release of the fitting, a phase shift occurs between the transmission member and the cylinder. Consequently, in some cases, a member such as a piston cannot be incorporated into the cylinder. As described above, fabrication efficiency is lowered when another member is to be incorporated after the incorporation of the transmission member.

Therefore, the present invention has an object to provide a disk brake capable of improving fabrication efficiency.

In order to achieve the above-mentioned object, for inserting an inserted portion of a transmission member through a hole formed in a cylinder bottom portion, an anti-rotation locking portion formed on the transmission member is fitted into a fitting area provided on the cylinder side before a sealing member of the transmission member is located inside the hole.

BRIEF DESCRIPTION OF THE DRAWINGS

FIG. 6A is a front view, FIG. 6B is a side view, and FIG. 6C is a rear view.

FIGS. 7A and 7B illustrate an actuator assembly constituting the disk brake of the embodiment according to the present invention, where FIG. 7A is a side view, and FIG. 7B is a rear view.

FIG. 8A is a view illustrating a state in which an actuator assembly is being incorporated into the caliper body, and FIG. 8B is a view illustrating a state after the incorporation.

FIGS. 9A to 9C illustrate a variation of the front half body constituting the disk brake of the embodiment according to the present invention, where FIG. 9A is a front view, FIG. 9B is a side view, and FIG. 9C is a bottom view.

FIGS. 10A to 10C illustrate another variation of the front half body constituting the disk brake of the embodiment according to the present invention, where FIG. 10A is a side view, FIG. 10B is a bottom view, and FIG. 10C is a rear view.

DETAILED DESCRIPTION OF THE INVENTION

Figure 1:
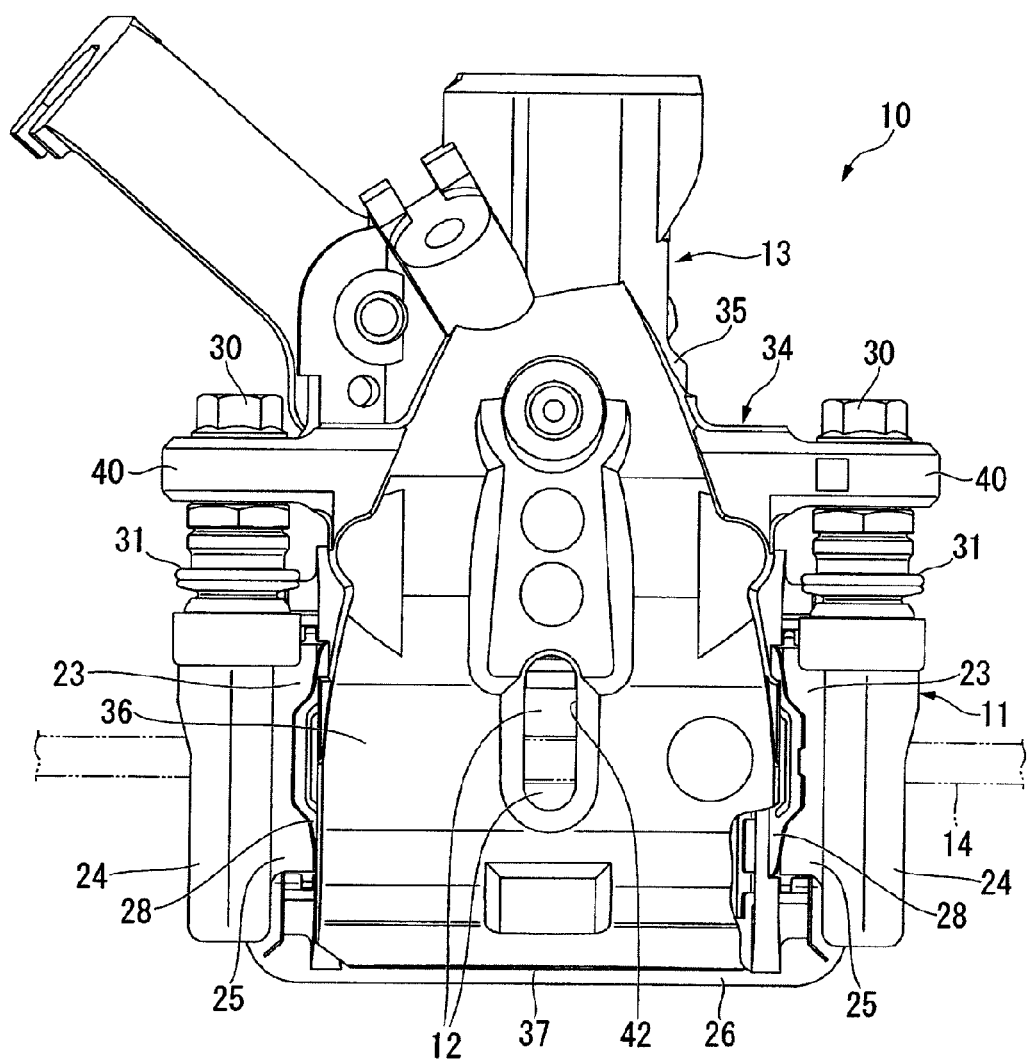
FIG. 1 is a plan view illustrating a disk brake of an embodiment according to the present invention.

Hereinafter, an embodiment according to the present invention is described below referring to the drawings.

Figure 2:
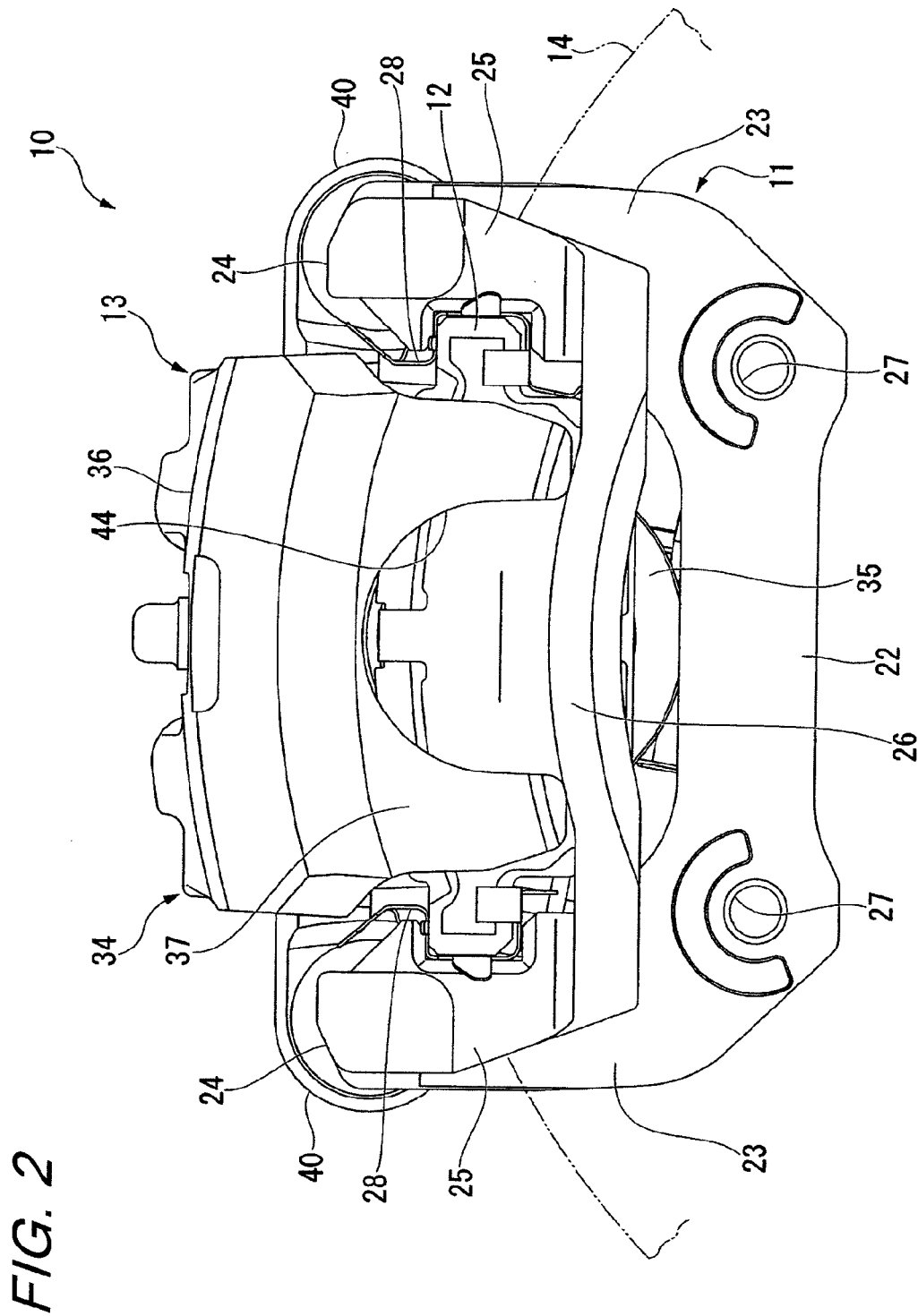
FIG. 2 is a front view illustrating the disk brake of the embodiment according to the present invention.

As illustrated in FIG. 1, a disk brake 10 of this embodiment includes a carrier 11, a pair of pads 12, and a caliper 13. As illustrated in FIG. 2, the carrier 11 is provided so as to pass over the outer diameter side of a disk 14 rotating with a wheel (rotary body) (not shown), which corresponds to a target to be braked, and is fixed to a non-rotating portion of a vehicle (not shown). The pair of pads 12 are supported by the carrier 11 so as to be slidable in an axial direction of the disk 14 while being provided so as to be opposed to both surfaces of the disk 14, respectively. The caliper 13 is supported by the carrier 11 so as to be slidable in the axial direction of the disk 14 while passing over the outer diameter side of the disk 14, and presses the pads 12 against the disk 14, to thereby apply a frictional resistance to the disk 14. Hereinafter, a radial direction of the disk 14 is referred to as a disk radial direction, the axial direction of the disk 14 is referred to as a disk axial direction, and a rotation direction of the disk 14 is referred to as a disk rotating direction.

The carrier 11 is configured in an integrated manner to include: a base plate portion 22 having a mounting hole 27 for the vehicle; a pair of inner-side pad supporting portions 23 for slidably supporting an inner-side one of the pads 12 through an intermediation of a pair of pad guides 28; a pair of outer-side pad supporting portions 25 for slidably supporting an outer-side one of the pads 12 through an intermediation of the pair of pad guides 28; a pair of connection portions 24 for connecting the inner-side pad supporting portions 23 and the outer-side pad supporting portions 25 to each other; and a beam portion 26 for connecting the pair of outer-side pad supporting portions 25 to each other.

Support pins 30 are slidably fitted from the inner side to the carrier 11 at the positions of the pair of connection portions 24 which are on the outer side in the disk radial direction at both ends in the disk rotating direction so that the support pins 30 are slidable in the disk axial direction. The caliper 13 is mounted to the carrier 11 through an intermediation of the support pins 30. Note that, portions of the pair of support pins 30, which are located between the caliper 13 and the carrier 11, are respectively covered with a pair of expandable and contractable boots 31.

The caliper 13 includes a caliper body 34, which is supported by the carrier 11 through an intermediation of the support pins 30 while passing over the disk 14.

Figure 3:
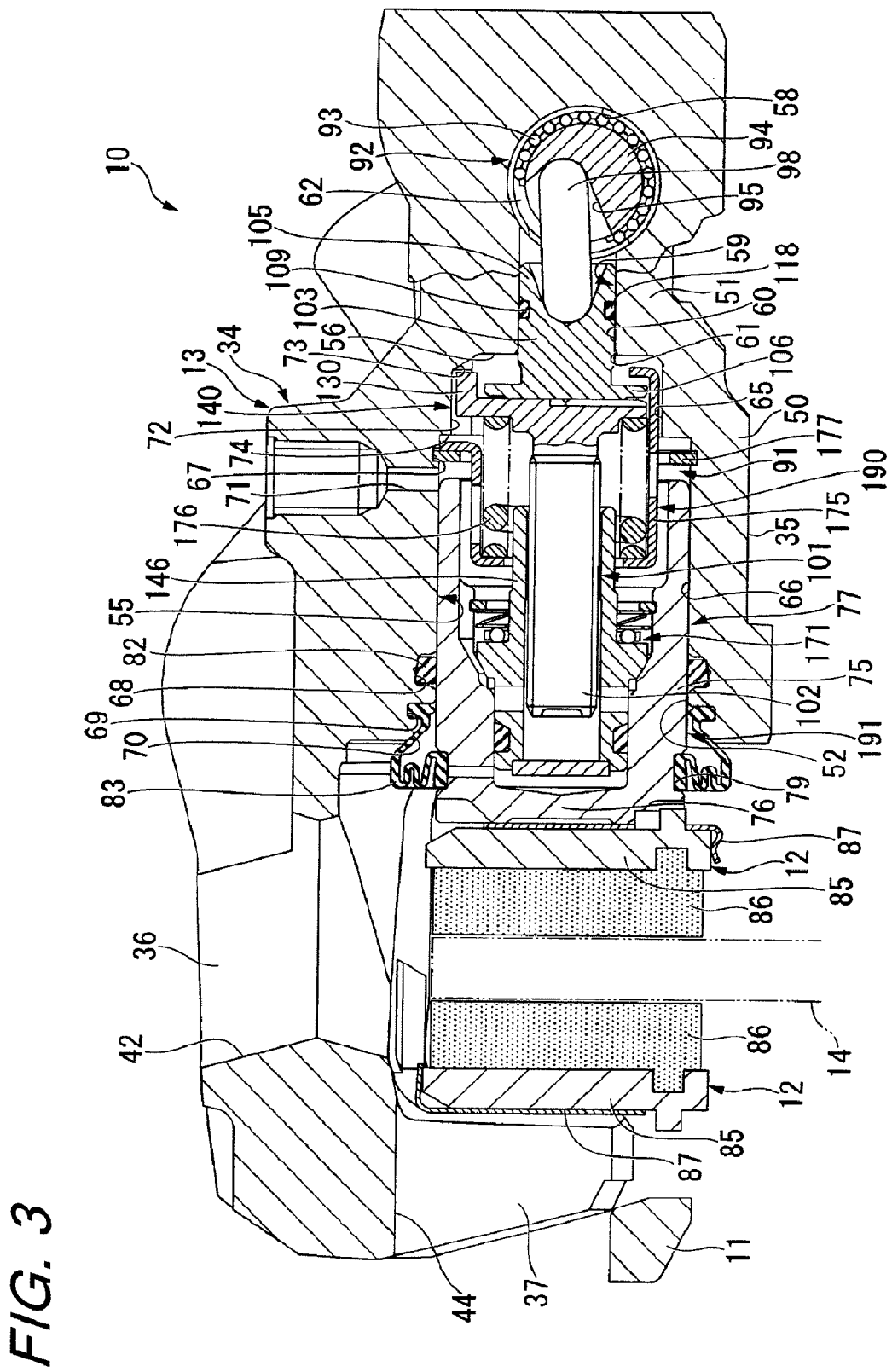
FIG. 3 is a side sectional view illustrating the disk brake of the embodiment according to the present invention.

The caliper body 34 includes, as illustrated in FIG. 3: a cylinder portion (cylinder) 35 having a cylindrical shape with a closed end; a bridge portion 36; and a claw portion 37, and is integrally formed of an aluminum alloy. The caliper body 34 of the caliper 13 is a fist type one provided with the cylinder portion 35 on one surface side of the disk 14, the claw portion 37 on the other surface side of the disk 14, and the bridge portion 36 for connecting the claw portion 37 and the cylinder portion 35 to each other, the bridge portion being provided so as to pass over the disk 14.

As illustrated in FIG. 1, a pair of pin mounting portions 40 projecting to both sides in the disk rotating direction are formed at an intermediate portion of the cylinder portion 35 of the caliper body 34 in the disk axial direction. The above-mentioned support pins 30 are fixed to the pin mounting portions 40 described above.

The bridge portion 36 is formed to be provided to the caliper body 34 on the side of the pin mounting portions 40, which is closer to the claw portion 37, so as to have an approximately plate-like shape curved along an outer circumferential surface of the disk 14. A rectangular window portion 42 penetrating through the bridge portion 36 in the disk axial direction is formed at a center position of the bridge portion 36 in the disk rotating direction. The window portion 42 is provided for visually confirming a state of abrasion of the pads 12.

Moreover, the above-mentioned claw portion 37 is formed to be provided to the caliper body 34 to have a plate-like shape with an approximately constant width in the disk rotating direction on the side of the bridge portion 36, which is opposite to the cylinder portion 35, as illustrated in FIG. 2. A recess 44 for inserting a tool for processing the cylinder portion 35 therethrough is formed to have an approximately semi-circular concave shape to pass through the claw portion 37 in the disk axial direction.

As illustrated in FIG. 3, the cylinder portion 35 of the caliper body 34 includes: a cylinder cylindrical portion 50 having a cylindrical shape; and a cylinder bottom portion (bottom portion) 51 for closing one end of the cylinder cylindrical portion 50, which has a cylindrical shape with a closed end so that a cylinder opening portion 52 is opposed to the side of the inner-side one of the pads 12, which is opposite to the disk 14. Here, an inner circumferential surface and a bottom surface 56 of the cylinder cylindrical portion 50 are referred to as a cylinder bore 55. The term "inside (in) the cylinder" in the present invention means the range covered by the cylinder bore 55.

A cam hole 58, which has a circular cross section along a direction perpendicular to the axial direction of the cylinder portion 35, is formed to be provided to the cylinder bottom portion 51 of the caliper body 34 at a distance from the bottom surface 56. Moreover, a bottom hole 59 having a circular cross section is formed to pass from a center position of the bottom surface 56 to the cam hole 58 along the axial direction of the cylinder portion 35. The bottom hole 59 includes: a hole portion 60 having a constant diameter; and a chamfered hole portion 61 formed coaxially with the hole portion 60 between the hole portion 60 and the bottom surface 56 so as to have an increasing diameter toward the bottom surface 56 side. A space inside the cam hole 58 formed in the caliper body 34 serves as a cam chamber 62 separately defined from the cylinder bore 55 in a state in which an actuator assembly 190 is incorporated.

Figure 4:
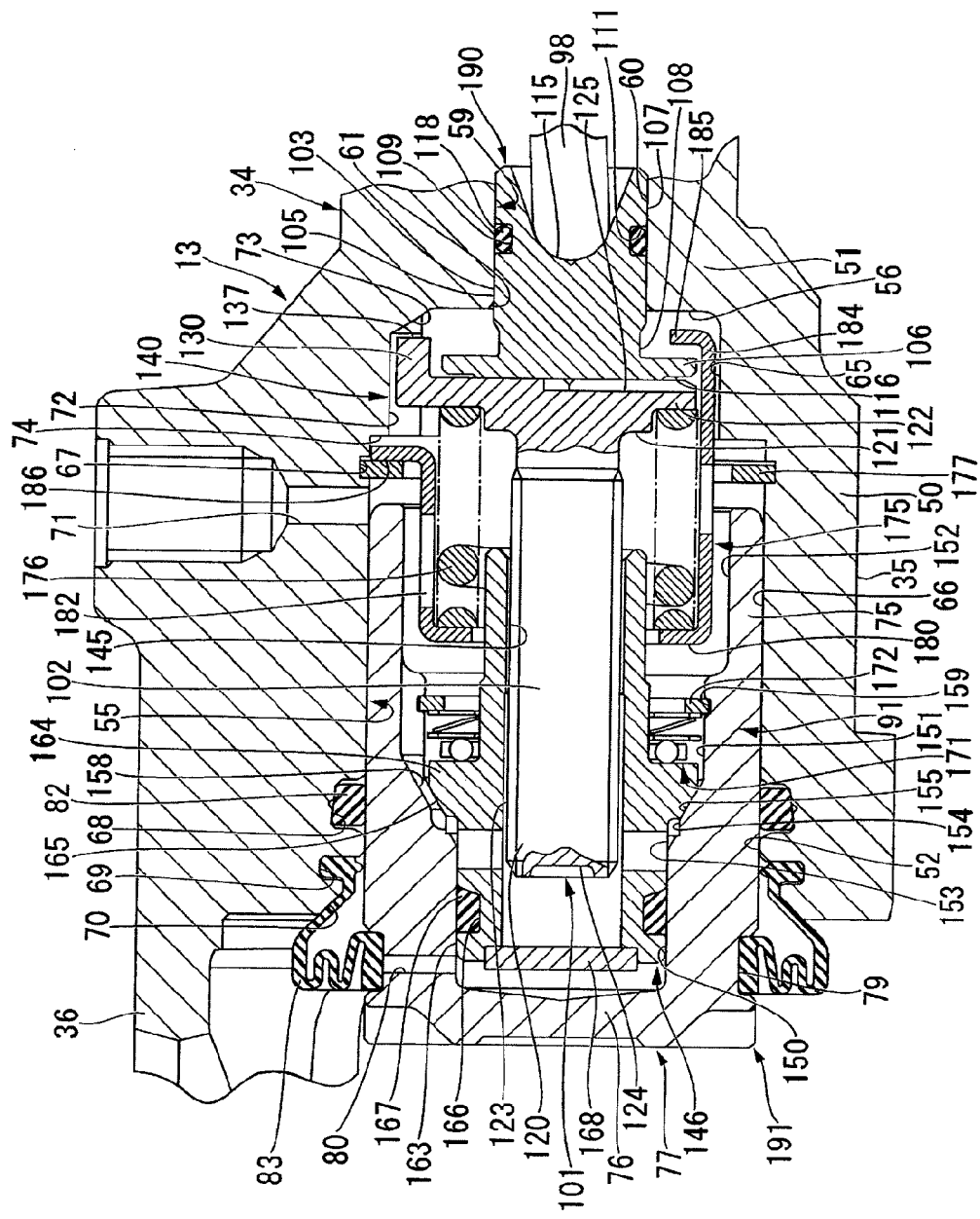
FIG. 4 is a partially enlarged side sectional view illustrating a principal part of the disk brake of the embodiment according to the present invention.

Moreover, as also illustrated in FIG. 4, on the inner circumference (cylinder bore 55) of the cylinder cylindrical portion 50 of the caliper body 34, a bottom-position hole 65 having a circular sectional shape is formed coaxially with the bottom surface 56 on the side closest to the cylinder bottom portion 51. A slide hole 66 having a circular sectional shape with a larger diameter than that of the bottom-position hole 65 is formed coaxially with the bottom-position hole 65 on the side of the bottom-position hole 65, which is closer to the cylinder opening portion 52, on the inner circumference (cylinder bore 55) of the cylinder cylindrical portion 50 of the caliper body 34. In the vicinity of an end of the slide hole 66 on the bottom-position hole 65 side, an annular ring groove 67 having a larger diameter than that of the slide hole 66 is formed coaxially with the slide hole 66. Further, in the vicinity of an end of the slide hole 66 on the cylinder opening portion 52 side, an annular seal groove 68 having a larger diameter than that of the slide hole 66 is formed coaxially with the slide hole 66. On the side of the seal groove 68, which is closer to the cylinder opening portion 52, a stepped annular boot groove 69, which has a larger diameter than that of the slide groove 66 and includes a large-diameter portion and a small-diameter portion, is formed coaxially with the slide hole 66. In addition, at the position of the cylinder opening portion 52 on the inner circumference (cylinder bore 55) of the cylinder cylindrical portion 50, a tapered chamfered portion 70 is formed coaxially with the slide hole 66 so as to be adjacent to the boot groove 69.

A brake fluid inlet/outlet hole 71, which is opened on the side of the ring groove 67 of the slide hole 66, the side being slightly close to the cylinder opening portion 52, is provided to the cylinder cylindrical portion 50 of the caliper body 34 and is formed to pass through the cylinder cylindrical portion 50 so as to be open to the bridge portion 36 side along the disk radial direction.

Figure 5:
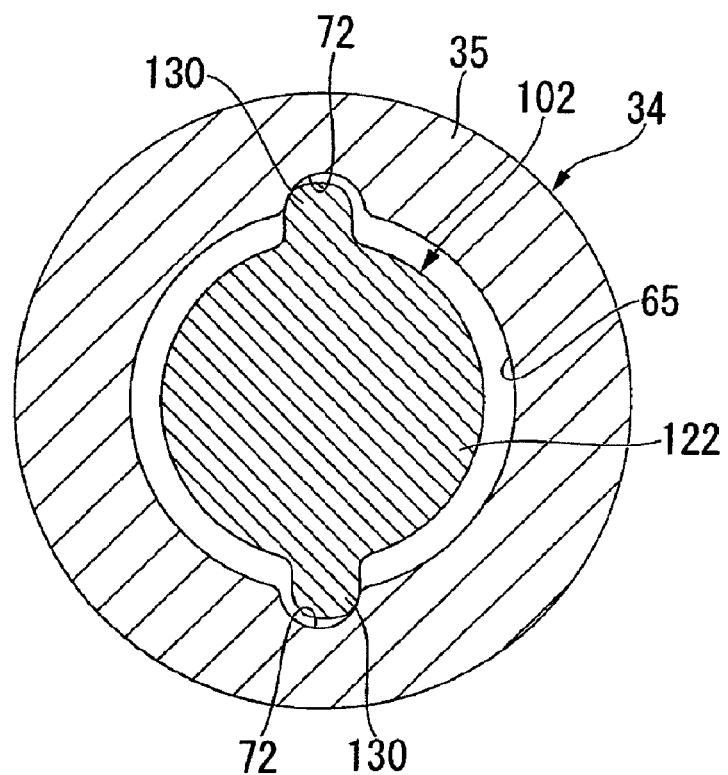
FIG. 5 is a sectional view illustrating a state of anti-rotation locking between a caliper body and a front body of the disk brake of the embodiment according to the present invention.

Then, on an inner circumferential surface of the bottom-position hole 65 of the cylinder cylindrical portion 50 of the caliper body 34, axial grooves (fitting areas) 72 which are radially concaved and extend in the axial direction, are formed from a bottom surface 74 of the slide hole 66 to a position just before reaching the bottom surface 56 of the cylinder bottom portion 51. Each of the axial grooves 72 has a constant sectional shape perpendicular to the axis of the cylinder portion 35 regardless of the axial position thereof and forms a semi-cylindrical surface shape as illustrated in FIG. 5. The axial grooves 72 are formed in the same shape at two positions, which are separated from each other by 180 degrees in the circumferential direction of the bottom-position hole 65. As illustrated in FIG. 4, ends of the axial grooves 72 on the bottom surface 56 side are along a direction perpendicular to the axis of the cylinder portion 35. On the side of the axial grooves 72, which is closer to the bottom surface 56, grooves 73, each having a gradually decreasing sectional area as being closer to the bottom surface 56, are formed consecutive to the axial grooves 72.

The caliper 13 has a piston 77, which is formed in a cylindrical shape with a lid to include a cylinder portion 75 having a cylindrical shape and a disk-like lid portion 76. On an outer circumferential portion of the piston 77 on the lid portion 76 side, an annular boot groove 79 which is concaved radially inward is formed. Ventilation holes 80 passing through the cylinder portion 75 from the inside to the outside along the radial direction are formed so as to be open inside the boot groove 79. The piston 77 is slidably fitted into the slide hole 66 of the cylinder portion 35 of the caliper body 34 with the cylinder portion 75 side being oriented toward the cylinder bottom portion 51.

Moreover, the caliper 13 includes: a annular piston seal 82 retained in the above-mentioned seal groove 68 of the cylinder portion 35 so as to seal a gap between the piston 77 and the bore 55 of the cylinder portion 35; and an expandable and contractable boot 83 having one end fitted into the above-mentioned boot groove 69 of the cylinder portion 35 and the other end fitted into the boot groove 79 of the piston 77. The boot 83 is mounted to the piston 77 to be fitted into the boot groove 79, to thereby close the ventilation holes 80.

As illustrated in FIG. 3, the caliper 13 slides the piston 77 inside the slide hole 66 of the cylinder portion 35 by a brake hydraulic pressure introduced between the cylinder portion 35 and the piston 77 through the brake fluid inlet/outlet hole 71 so that the piston 77 projects from the cylinder portion 35 in a direction of the pads 12. As a result, the pair of pads 12 are gripped from both sides by the piston 77 and the claw portion 37 to press the pads 12 against the disk-like disk 14.

As described above, the piston 77 slides inside the cylinder portion 35 to be projected from the cylinder portion 35 toward the claw portion 37 by the brake hydraulic pressure introduced into the cylinder portion 35 from a master cylinder (not shown) at the time of normal braking executed by a pressing operation performed on a brake pedal. In this manner, the pair of pads 12 are brought into contact with the disk 14 to generate a braking force. Instead of using the brake hydraulic pressure as described above, a parking brake mechanism 91 for mechanically causing the piston 77 to project to press the pair of pads 12 against the disk 14 to generate the braking force is provided inside the cylinder portion 35.

The parking brake mechanism 91 includes a cam mechanism 92. The cam mechanism 92 includes: an arc-shaped bearing 93 fitted into the cam hole 58 constituting the cam chamber 62 of the caliper body 34; and an approximately columnar cam main body 94 rotatably supported in the cam hole 58 through an intermediation of the bearing 93. A cam concave portion 95, which is concaved in an approximately V-like shape from a radial outer circumferential surface of the cam main body 94 toward the center, is formed on the cam main body 94. The cam concave portion 95 has the most concaved position (bottom portion) thereof which is offset from a center axis of the cam main body 94.

The cam mechanism 92 includes a cam rod 98 having one end inserted into the cam concave portion 95 and the other end located in the bottom hole 59. When the cam main body 94 is rotationally driven about the axis thereof along the direction perpendicular to the axis of the cylinder portion 35, the cam rod 98 varies the amount of projection from the cam main body 94 according to the shape of the cam concave portion 95. Specifically, the bottom portion of the cam concave portion 95 is offset from the center of the cam main body 94. As a result, when the cam main body 94 rotates, the position of the bottom portion of the cam concave portion 95 moves forward and backward with respect to the bottom hole 59 to change the amount of projection of the cam rod 98 abutting against the bottom portion. Note that, the cam main body 94 rotates through an intermediation of a connection lever (not shown) by a manual operation of a parking brake lever (not shown), by driving an electric cable puller with a motor or the like.

Moreover, inside the cylinder portion 35, a push rod (transmission member) 101 pushed by the cam rod 98 of the cam mechanism 92 to be moved in the axial direction of the cylinder portion 35 is provided.

Further, in this embodiment, the push rod 101 is divided axially in two bodies, that is, a front half body 102 situated on the front side at the time of forward movement, in other words, on the piston 77 side, and a rear half body 103 situated on the rear side at the time of forward movement, in other words, on the cylinder bottom portion 51 side.

As illustrated in FIG. 4, the rear half body 103 of the push rod 101 is integrally molded into a shape having: a columnar shaft portion 105 serving as an inserted portion inserted into the bottom hole 59; and a disk-like flange portion 106 radially extending outward from one end of the shaft portion 105 so as to be coaxial with the shaft portion 105.

A portion of the shaft portion 105 on the flange portion 106 side is a small-diameter portion 108 having a smaller diameter than that of the remaining portion corresponding to a large-diameter portion 107. An annular seal groove 109, which is concaved radially inward, is formed coaxially with the large-diameter portion 107 at an axial middle position of the large-diameter portion 107.

Further, a cam concave portion 115 is formed on the shaft portion 105 so as to be concaved in an approximately V-like shape from an end surface on the side opposite to the flange portion 106 on a center axis of the shaft portion 105. The other end of the cam rod 98 is inserted into the cam concave portion 115. An annular level-difference portion 116 axially concaved to form a level difference is formed coaxially with the shaft portion 105 on the outer circumference side of the flange portion 106, which is opposite to the shaft portion 105. A distal end surface of the flange portion 106 except for the level-difference portion 116 is a flat surface along the direction perpendicular to the axis.

As illustrated in FIG. 3, the shaft portion 105 of the rear half body 103 is slidably inserted into the bottom hole 59 for bringing the bottom surface 56 of the cylinder bottom portion 51 and the cam chamber 62 into communication with each other. At this time, a ring-shaped push rod seal (sealing member) 118 is provided and retained in the seal groove 109 of the rear half body 103. The push rod seal 118 constantly seals a gap between the shaft portion 105 of the rear half body 103 and the bottom hole 59 of the cylinder portion 35. Specifically, the push rod seal 118 in the seal groove 109 of the shaft portion 105 of the rear half body 103 defines an internal space of the cylinder portion 35 and the cam chamber 62. Although not shown, a portion of the cam chamber 62 other than the bottom hole 59, which is held in communication with the bottom hole 59, is sealed from the outside so as to prevent rain water or the like from entering. As a result, the cam chamber 62 is sealed as a whole. The cam mechanism 92 is located in the cam chamber 62 sealed from the outside.

Figure 6A:
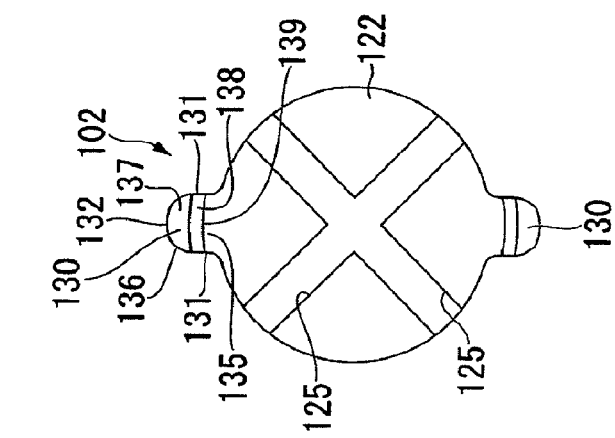
FIGS. 6A to 6C illustrate the front half body constituting the disk brake of the embodiment according to the present invention, where
Figure 6B:
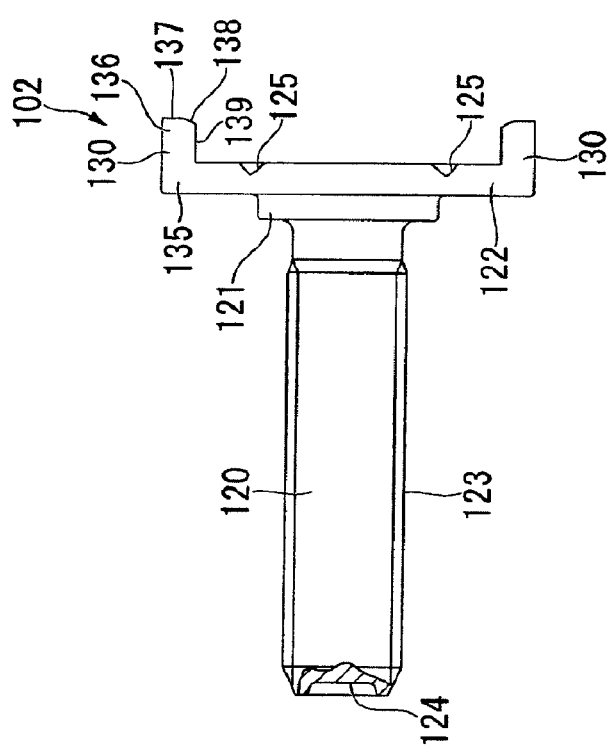
Figure 6C:
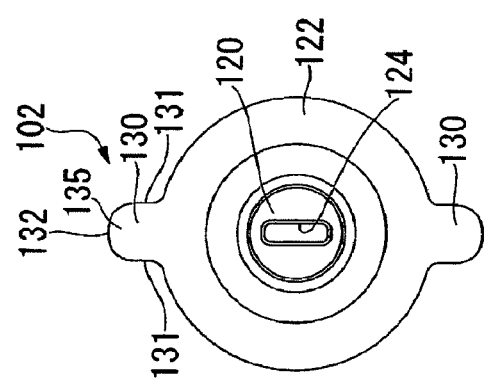

The front half body 102 of the push rod 101 is integrally molded into a shape having, as illustrated in FIGS. 6A to 6C: an approximately columnar shaft portion (extending portion) 120; an approximately disk-like step portion 121 extending radially outward from one end of the shaft portion 120 in a coaxial manner; and an approximately disk-like flange portion 122 extending radially outward from the side of the step portion 121, which is opposite to the shaft portion 120, in a coaxial manner.

On a radial outer circumferential surface of the shaft portion 120 except for a portion adjacent to the step portion 121, an external thread (thread portion) 123 is formed. In a radial center region of an end surface of the shaft portion 120, which is on the side opposite to the step portion 121, a tool groove 124, which is axially concaved and radially extends, is formed.

Two V-shaped grooves 125, each being axially concaved and passing radially, are formed to perpendicularly cross each other on a surface of the flange portion 122, which is on the side opposite to the shaft portion 120. The surface of the flange portion 122, which is on the side opposite to the shaft portion 120, is a flat surface along a direction perpendicular to the axis except for the V-shaped grooves 125.

For the front half body 102, anti-rotation locking portions 130, each projecting radially outward, are formed integrally with the outer circumferential portion of the flange portion 122. When the front half body 102 is viewed from the axial direction, each of the anti-rotation locking portions 130 includes: a pair of extending surface portions 131 extending from the outer circumferential portion of the flange portion 122 so as to be parallel to each other along the radial direction; and a curved distal end surface portion 132 for connecting projecting distal ends of the projecting surface portions 131 to each other. The anti-rotation locking portions 130 are formed in the same shape at two positions separated away from each other by 180 degrees in the circumferential direction of the flange portion 122. The pair of anti-rotation locking portions 130 are formed at the positions different from those of the two V-shaped grooves 125 and are formed so as to have phases respectively shifted by 45 degrees with respect to each of the V-shape grooves 125.

Each of the above-mentioned anti-rotation locking portions 130 includes: a radial projecting portion 135 projecting radially outward from the outer circumferential portion of the flange portion 122 at the same axial position and with the same thickness as those of the flange portion 122; and an axial projecting tab portion 136 projecting from an outer end portion of the radial projecting portion 135, on the side opposite to the flange portion 122, along the axial direction of the flange portion 122. Specifically, as illustrated in FIG. 4, the anti-rotation locking portions 130 serve as projecting tabs projecting from the outer circumferential portion of the flange portion 122 toward the cylinder bottom portion 51 along the axial direction of the cylinder portion 35. As illustrated in FIG. 6B, distal end surfaces 137 of the axial projecting tab portions 136, on the side opposite to the shaft portion 120, are along the direction perpendicular to an axis of the front half body 102. On the inner side of each of the distal end surfaces 137, a chamfered portion 138 which is inwardly inclined so as to be positioned axially closer to the shaft portion 120. The extending surface portions 131 are formed on the side of the radial projecting portions 135 and the axial projecting tabs 136, which is closer to the flange portion 122, in the radial direction of the flange portion 122, whereas the distal end surface portions 132 are formed on the side of the radial projecting portions 135 and the axial projecting tab portions 136, which is opposite to the flange portion 122. An inner surface 139 of each of the axial projecting tab portions 136, which is on the side opposite to the distal end surface portion 132, forms a cylindrical surface shape approximately coaxial with the flange portion 122.

An outer diameter of the flange portion 122 is set to be smaller than an inner diameter of the bottom-position hole 65 of the cylinder portion 35 as illustrated in FIG. 5, and hence the front half body 102 is located inside the bottom-position hole 65. A diameter of a circle passing through both outer end portions of the pair of anti-rotation locking portions 130 is larger than the inner diameter of the bottom-position hole 65 and is smaller than a diameter of a circle passing through both groove bottom portions of the pair of axial grooves 72. Therefore, the flange portion 122 of the front half body 102 is located in the bottom-position hole 62 while the pair of anti-rotation locking portions 130 are respectively located in the pair of axial grooves 72. As a result, the rotation relative to the cylinder portion 35 is restricted.

As illustrated in FIG. 4, when the front half body 102 is inserted into the bottom-position hole 65 of the cylinder portion 35 as described above, the flange portion 122 is brought into abutment against the flange portion 106 of the rear half body 103. Moreover, by fitting the anti-rotation locking portions 130 respectively into the axial grooves 72, the rotation relative to the cylinder portion 35 is restricted. Note that, the sliding of the anti-rotation locking portions 130 through the axial grooves 72 in the axial direction of the cylinder portion 35 allows the front half body 102 to be movable in the axial direction of the cylinder 35 inside the cylinder portion 35 while the rotation about the axis relative to the cylinder 35 is restricted. As a result, the front half body 102 can be separated from and be brought close to the cylinder bottom portion 51. Therefore, the anti-rotation locking portions 130 and the axial grooves 72 constitute an anti-rotation locking mechanism 140 for allowing the front half body 102 of the push rod 101 to be axially movable while restricting the rotation relative to the cylinder portion 35.

The parking brake mechanism 91 includes an approximately cylindrical clutch member 146 having an internal thread 145 formed on the inner diameter side, which is threadably engaged with the external thread 123 of the front half body 102 of the push rod 101 inside the cylinder portion 35.

Here, a portion of the inner diameter side of the piston 77 on the lid portion 76 side is a small-diameter inner diameter portion 150 having a small diameter, a portion closer to the opening than the small-diameter inner diameter portion 150 is an intermediate inner diameter portion 151 having a larger diameter than that of the small-diameter inner diameter portion 150, and a portion closer to the opening than the intermediate inner diameter portion 151 is a large-diameter inner diameter portion 152 having a larger diameter than that of the intermediate inner diameter portion 151. Between the small-diameter inner diameter portion 150 and the intermediate inner diameter portion 151, a tapered surface portion 153 which is consecutive to the small-diameter inner diameter portion 150 and is inclined so as to have a larger diameter on the intermediate inner diameter portion 151 side, a level-difference portion 154 having an annular level difference, which has a larger diameter than that of the larger diameter portion of the tapered surface portion 153, and a tapered surface portion 155 which is consecutive to the level-difference portion 154 and is inclined to have a larger diameter on the intermediate inner diameter portion 151 side so as to be consecutive to the intermediate inner diameter portion 151, are formed coaxially with the small-diameter inner diameter portion 150 and the intermediate inner diameter portion 151, in this order from the small-diameter inner diameter portion 150 side.

Moreover, on the inner diameter side of the piston 77, a communication groove 158 through the intermediate inner diameter portion 151 and the tapered surface portion 155 is formed in the axial direction according to the shapes thereof so as to connect the larger-diameter inner diameter portion 152 and the level-difference portion 154 to each other. An annular locking groove 159 is formed on the intermediate inner diameter portion 151. At the position on the small-diameter inner diameter portion 150, which is close to the lid portion 76, the above-mentioned ventilation holes 80 are formed.

The distal end side of the clutch member 146 is a fitting portion 163 fitted into the small-diameter inner diameter portion 150 of the piston 77. A radially extending flange portion 164 is formed adjacent to the fitting portion 163. A tapered portion 165 abutting against the tapered surface portion 155 of the piston 77 is formed coaxially with the flange portion 164 on the fitting portion 163 side. Moreover, an annular seal groove 166 is formed on the fitting portion 163 of the clutch member 146. In the seal groove 166, a ring-shaped clutch member seal 167 is retained. The clutch member seal 167 seals a gap between the fitting portion 163 of the clutch member 146 and the small-diameter inner diameter portion 150 of the piston 77. The internal thread 145 is formed on the inner circumferential portion of the clutch member 146 on the side opposite to the fitting portion 163. An end of the inner circumferential portion on the fitting portion 163 side is closed by a lid body 168.

Here, the cam mechanism 92 illustrated in FIG. 3 is rotationally moved so that the cam rod 98 pushes the rear half body 103 of the push rod 101. Then, the rear half body 103 linearly moves in the axial direction. The front half body 102 of the push rod 101 is pushed by the rear half body 103 to linearly move in the axial direction. Then, the clutch member 146 is pushed by the front half body 102 to linearly move in the axial direction, and hence, the clutch member 146 abuts against the tapered surface portion 155 of the piston 77 at the tapered portion 165 illustrated in FIG. 4 to force the piston 77 to slide toward the pads 12 with respect to the cylinder portion 35. Specifically, the push rod 101 is pushed by the cam rod 98 of the cam mechanism 92 illustrated in FIG. 3 to transmit a pushing force to the piston 77.

Note that, the external thread 123 of the push rod 101 and the internal thread 145 of the clutch member 146 have a clearance for allowing the axial movement by a predetermined amount without rotation between the push rod 101 and the clutch member 146.

Further, the above-mentioned ventilation holes 80 of the piston 77 on the lid portion 76 side are for allowing the gap between the piston 77 and the clutch member 146 to be open to the atmosphere through the boot 83.

The parking brake mechanism 91 includes an adjustment portion 171 for positional adjustment between the clutch member 146 and the push rod 101 inside the cylinder portion 35. The adjustment portion 171 is supported between the piston 77 and the flange portion 164 of the clutch member 146 by a C-shaped retaining ring 172 locked to the locking groove 159 formed on the intermediate inner diameter portion 151 of the piston 77. When the piston 77 is axially moved by the brake hydraulic pressure introduced into the cylinder portion 35, the adjustment portion 171 axially moves the clutch member 146 so as to cause the clutch member 146 to follow the piston 77 by the threadable engagement between the internal thread 145 and the external thread 123 while rotating the clutch member 146 relative to the front half body 102 of the push rod 101 which is substantially in a stop state. Moreover, when the push rod 101 linearly moves in the axial direction, the adjustment portion 171 does not rotate the clutch member 146 relative to the push rod 101. As a result, the clutch member 146 is linearly moved integrally with the push rod 101 by the external thread 123 and the internal thread 145. The front half body 102 of the push rod 101 includes the external thread 123 formed on the shaft portion 120 extending in the axial direction of the cylinder portion 35, for axial positional adjustment of the clutch member 146, in other words, for adjustment of a total length obtained by adding a length of the clutch member 146 and a length of the front half body 102.

The parking brake mechanism 91 includes: a cover member 175 provided so as to cover a part of the push rod 101; a push-rod biasing spring 176 provided between the flange portion 122 of the front half body 102 and the piston 77 side of the cover member 175 while the step portion 121 of the front half body 102 is located inside, the push-rod biasing spring biasing the front half body 102 toward the rear half body 103; and a C-shaped retaining ring 177 fitted into the ring groove 67 of the cylinder portion 35 to lock the cover member 175 to the cylinder portion 35 so as to restrict the movement toward the cylinder opening portion 52. The cover member 175, the push-rod biasing spring 176, and the retaining ring 177 described above are located inside the cylinder portion 35.

The cover member 175 includes: a ring-shaped bottom portion 180 having inner side, into which the clutch member 146 is inserted; and a cylindrical portion 182 extending from an outer circumferential end edge of the ring-shaped bottom portion 180 toward one axial side to form an approximately cylindrical shape. Moreover, as illustrated in FIGS. 7A and 7B, a plurality of (more specifically, four) extending portions 184, each extending from the cylindrical portion 182 along the axial direction toward the side opposite to the ring-shaped bottom portion 180 to have an approximately constant width in the circumferential direction, are equiangularly formed. A plurality of ventilation holes 183 for reduction in weight, visual inspection of the interior at the time of assembly, and the like are formed through the cylindrical portion 182.

An end of each of the extending portions 184, which is on the side opposite to the cylindrical portion 182, is bent radially inward to form an inner locking tab portion 185. A plurality of (specifically, four) outer locking tab portions 186 extending from an end of the cylindrical portion 182, which is on the side opposite to the ring-shaped bottom portion 180, so as to be bent radially outward are formed at positions between the extending portions 184 adjacent to each other in the circumferential direction. The inner locking tab portions 185 and the outer locking tab portions 186, which are formed to be shifted from each other in the circumferential direction, are all parallel to the ring-shaped bottom portion 180. Note that, between the extending portions 184 adjacent to each other, through-grooves 187 passing from the outer locking tab portions 186 to the side opposite to the ring-shaped bottom portion 180 are formed. The number of the through-grooves 187 is also plural (specifically, four).

The cover member 175 is locked to the side of the retaining ring 177 retained in the ring groove 67 of the cylinder cylindrical portion 50, which is close to the cylinder bottom portion 51, by the plurality of outer locking tab portions 186, as illustrated in FIG. 4. As a result, the movement toward the cylinder opening portion 52 is restricted. Moreover, the inner locking tab portions 185 of the plurality of extending portion 184 of the cover member 175 can lock the flange portion 106 of the rear half body 103 of the push rod.

The push rod 101, the push-rod biasing spring 176, and the cover member 175 are previously combined to form a cartridge as illustrated in FIGS. 7A and 7B, which is then incorporated as a push rod assembly into the cylinder portion 35 of the caliper body 34.

For example, a cover member, which has a shape different from the above-mentioned shape in that only the inner locking tab portions 185 are not bent with respect to the extending portions 184, is prepared as the cover member 175. The push-rod biasing spring 176 is inserted into the cover member 175 so as to abut against the ring-shaped bottom portion 180. Then, the front half body 102 of the push rod 101 is inserted on the inner side of the push rod biasing spring 176 while the shaft portion 120 is oriented forward so that the anti-rotation locking portions 130 are inserted into the through-grooves 187 of the cover member 175. Then, the flange portion 122 of the front half body 102 is brought into abutment against the push rod biasing spring 176. Next, the flange portion 106 of the rear half body 103 of the push rod 101 is inserted between the plurality of anti-rotation locking portions 130 of the front half body 102 to bring the flange portion 106 into abutment against the flange portion 122 of the front half body 102. Then, in this state, on the side of the flange portion 122 of the rear half body 103, which is opposite to the front half body 102, all the inward locking tab portions 185 are bent inward in the radial direction of the cover member 175, to thereby form a cartridge. In this manner, the removal of the rear half body 103 from the cover member 175 is restricted. As a result, the removal of the front half body 102 and the push rod biasing spring 176 from the cover member 175 is restricted.

By the actuator assembly steps described above, the push rod 101, the push-rod biasing spring 176, and the cover member 175 are previously combined to form the cartridge. In the manner as described above, the actuator assembly (actuator for parking brake) 190 including the push rod 101, the push-rod biasing spring 176, and the cover member 175 is obtained by assembly. Note that, the position at which each of the inner locking tab portion 185 of the cover member 175 is bent is set so that a length of the push-rod biasing spring 176 at the time of integration with the actuator assembly 190 is smaller than a free length.

Next, the actuator assembly 190 obtained as an assembly by the actuator assembly steps described above is inserted into the cylinder portion 35 (cylinder bore 55) of the caliper body 34 illustrated in FIG. 3. At this time, the cam main body 94 is located inside the cam hole 58 provided on the cylinder bottom portion 51 through an intermediation of the bearing 93 in the caliper body 34. The cam rod 98 is inserted from the cylinder opening portion 52 side into the bottom hole 59 of the caliper body 34 and the cam concave portion 95 of the cam main body 94 while the cam concave portion 95 of the cam main body 94 is oriented toward the bottom hole 59.

For the insertion of the actuator assembly 190 into the cylinder portion 35, the push rod seal 118 is fitted into the seal groove 109 of the shaft portion 105 of the rear half body 103, which projects from the cover member 175. Next, the actuator assembly 190 is inserted from the cylinder opening portion 52 side into the cylinder cylindrical portion 50 with the rear half body 103 side being oriented forward. At this time, the shaft portion 105 of the rear half body 103 is first inserted into the bottom hole 59 of the cylinder bottom portion 51. As a result, a state in which the movement of the actuator assembly 190 in the radial direction of the cylinder portion 35 is restricted is obtained.

Figure 8A:
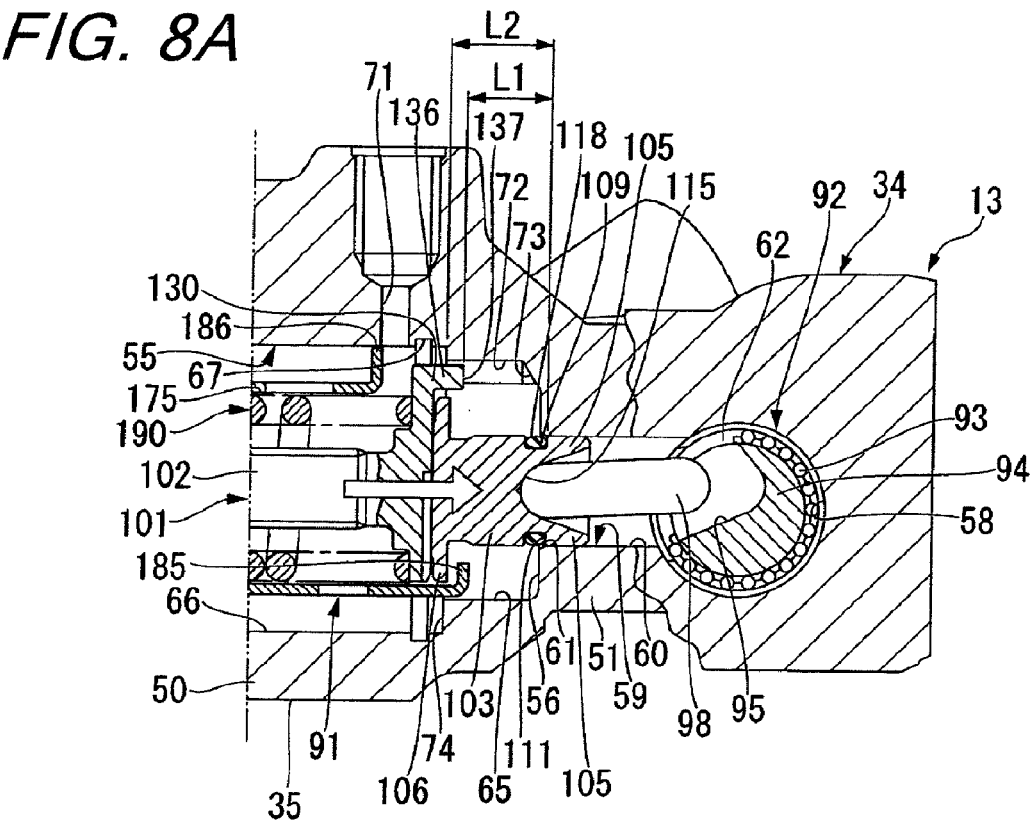
FIGS. 8A and 8B are partially enlarged side sectional views illustrating the principal part of the disk brake of the embodiment according to the present invention, where

Further, with the further insertion of the shaft portion 105 of the rear half body 103 into the bottom hole 59, the anti-rotation locking portions 130 radially projecting from the cover member 175 of the actuator assembly 190 are generally brought into abutment against the bottom portion 74 of the slide hole 66 of the cylinder cylindrical portion 50. A straight slot screwdriver or the like is inserted into the tool groove 124 illustrated in FIG. 4 in this state to rotate the front half body 102 to align the phases of the anti-rotation locking portions 130 with those of the axial grooves 72. In this manner, the further insertion of the actuator assembly 190 is enabled. Then, when the actuator assembly 190 is further inserted, the axial projecting tab portions 136 of the anti-rotation locking portions 130 are inserted into the axial grooves 72 as illustrated in FIG. 8A. Thereafter, the push rod seal 118 retained on the shaft portion 105 of the rear half body 103 is fitted into the constant-diameter hole portion 60 of the bottom hole 59.

When the push rod seal 118 is fitted into the hole portion 60 of the bottom hole 59 as described above, the cam mechanism 92 side is sealed. By an internal air pressure, a resistance is generated against the further insertion of the actuator assembly 190 toward the cylinder bottom portion 51. As described above, however, when the shaft portion 105 of the rear half body 103 is inserted into the bottom hole 59, the axial projecting tab portions 136 of the anti-rotation locking portions 130 of the actuator assembly 190 are fitted into the axial grooves 72 on the cylinder portion 35 side before the push rod seal 118 is positioned inside the hole portion 60 of the bottom hole 59. Therefore, even if the actuator assembly 190 is stopped by the resistance due to the air pressure, the axial projecting tab portions 136 are not removed from the axial grooves 72. As described above, the fitting of the axial projecting tab portions 136 of the anti-rotation locking portions 130 into the axial grooves 72 locks the cover member 175 against the rotation relative to the anti-rotation locking portions 130. Therefore, the rotation of the cover member 175 and the front half body 102 relative to the cylinder portion 35 is restricted. Here, the axial projecting tab portions 136 are fitted into the axial grooves 72 to serve as a guide for effecting the insertion of the shaft portion 105 into the bottom hole 59. As a result, fabrication efficiency of the disk brake is improved.

Here, specifically, in the state in which the front half body 102 and the rear half body 103 are axially in abutment against each other, a distance L1 from a wall surface 111 of the seal groove 109 of the rear half body 103 on the cam chamber 62 side to the distal end surface 137 of each of the anti-rotation locking portions 130 is set to be smaller than a distance L2 from an opening of the bottom hole 59 on the cylinder bottom portion 51 (boundary position between the hole portion 60 and the chamfered hole portion 61) to an end of each of the axial grooves 72, which is on the side opposite to the cam chamber 62 (cylinder opening portion 52 side), that is, to the bottom surface 74 of the slide hole 66. As a result, before the push-rod seal 118 exhibits ability of sealing the bottom hole 59, the anti-rotation locking portions 130 can be reliably located in the axial grooves 72. The above-mentioned distance L1 can be set to be smaller than the above-mentioned distance as long as the anti-rotation locking portions 130 can be fitted into the axial grooves 72 before the push rod seal 118 is located in the bottom hole 59 to provide the ability of sealing the bottom hole 59. In this case, however, for facilitating dimensional control for the fabrication or the like, the distance L1 is set to be equal to the distance from the wall surface 111 of the seal groove 109 to the distal end surface 137 of each of the anti-rotation locking portions 130 of the rear half body 103.

Figure 8B:
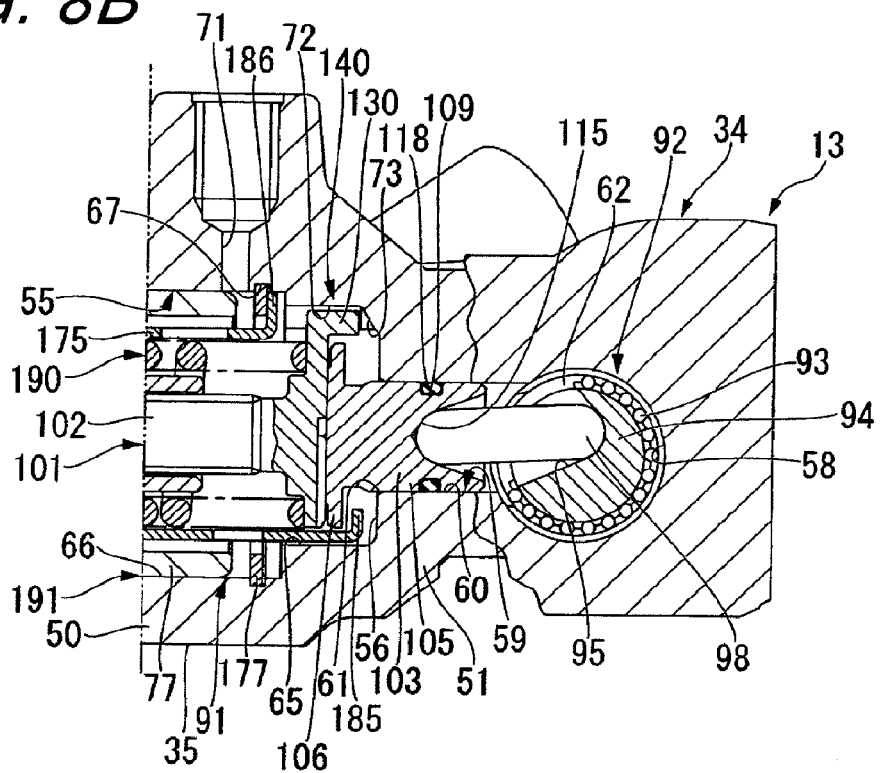

Next, the retaining ring 177 is mounted to the cylinder portion 35. Specifically, the retaining ring 177 is inserted from the cylinder opening portion 52 illustrated in FIG. 4 so that the outer locking tab portions 186 of the cover member 175 are pressed by the retaining ring 177 to press the actuator assembly 190 including the cover member 175 to the cylinder bottom portion 51 side against the above-mentioned air pressure on the cam chamber 62 side. Then, first, the cam rod 98 is interposed in a tensed manner between the cam concave portion 115 of the rear half body 103 and the cam concave portion 95 of the cam main body 94 to stop the rear half body 103. Further, when the cover member 175 is pressed to the cylinder bottom portion 51 side against the biasing force of the push rod biasing spring 176, the retaining ring 177 is fitted into the ring groove 67 to be mounted to the cylinder portion 35 as illustrated in FIG. 8B to lock the outer locking tab portions 186 of the cover member 175. In the manner described above, a state in which the removal of the actuator assembly 190 from the cylinder portion 35 is prevented by the retaining ring 177 is obtained. In this state, the inner locking tab portions 185 of the actuator assembly 190 are not brought into abutment against the bottom surface 56 of the cylinder bottom portion 51. Moreover, in this state, the rear half body 103 and the front half body 102 expand and contract the push-rod biasing spring 176 by the abutment against the cam rod 98 to set a length thereof to a predetermined set length. In addition, a clearance is generated between the flange portion 106 of the rear half body 103 and the inner locking tab portions 185 of the cover member 175. By the configuration as described above, the positioning of the push rod 101 is performed, while the push-rod biasing spring 176 is set to be able to separate the front half body 102 from the rear half body 103 by the amount of the predetermined clearance.

On the other hand, as illustrated in FIG. 4, the clutch member 146, to which the clutch member seal 167 is mounted, is fitted into the piston 77. In addition, the adjustment portion 171 is locked to the piston 77 by the retaining ring 172. As a result, the piston 77, the clutch member 146, and the adjustment portion 171 constitute another piston assembly 191.

Then, in the caliper body 34, the piston seal 82 inserted from the cylinder opening portion 52 is fitted into the seal groove 68 of the cylinder cylindrical portion 50. In addition, after one end of the boot 83 is fitted into the boot groove 69 of the cylinder portion 35, the above-mentioned piston assembly 191 is fitted into the slide hole 66 of the cylinder cylindrical portion 50 with the opening side of the piston 77 being oriented forward. The external thread 123 of the push rod 101 is threadably engaged with the internal thread 145 of the clutch member 146. In this manner, the piston assembly 191 is located inside the cylinder portion 35. Then, the other end of the boot 83 is fitted into the boot groove 79 of the piston 77.

In the manner described above, the assembly of the caliper 13 is completed.

In the disk brake 10 having the configuration described above, the parking brake lever or the braking pedal (not shown) is operated to rotate the cam main body 94 of the cam mechanism 92. Then, the amount of projection of the cam rod 98 is changed from small to large by the cam concave portion 95 of the cam member 39. As a result, the rear half body 103 and the front half body 102 linearly move toward the disk 14 while being held in abutment against each other. Then, the front half body 102 of the push rod 101 moves toward the disk 14 without rotating relative to the cylinder portion 35 while moving the anti-rotation locking portions 130 thereof through the axial grooves 72 formed on the cylinder portion 35. Then, the clutch member 146 moves integrally with the front half body 102 to move the piston 77 toward the disk 14 to mechanically press the pair of pads 12 against the disk 14.

On the other hand, when the brake hydraulic pressure is introduced between the cylinder portion 35 and the piston 77 by a normal brake operation performed on the brake pedal, the hydraulic pressure acts on a pressure-receiving area of the piston 77, which is created by the piston seal 82, to generate a thrust toward the disk 14. The hydraulic pressure also acts on a pressure-receiving area of the clutch member 146, which is created by the clutch member seal 167, to generate a thrust toward the disk 14. In the early stage, the clutch member 146 axially moves to press the piston 77 without being rotated by the amount of clearance in the threadably engaged state between the internal thread 145 and the external thread 123 of the push rod 101.

Then, when the brake hydraulic pressure is further introduced into the cylinder portion 35 to become equal to or higher than a predetermined hydraulic pressure, the clutch member 146 is pressed against the piston 77 by the hydraulic pressure acting on the clutch member 146. Then, the hydraulic pressure acts on the piston 77 to generate the thrust toward the disk 14. Therefore, the hydraulic pressure also acts on the clutch member 146 to increase the thrust toward the disk 14.

On the other hand, at this time, the hydraulic pressure also acts on the rear half body 103 of the push rod 101 with respect to a pressure-receiving area created by the push rod seal 118 to generate a thrust in the direction opposite to the disk 14. However, the push rod 101 is divided into two bodies, that is, the front half body 102 and the rear half body 103. Therefore, the thrust of the rear half body 103 in the direction opposite to the disk 14 is separated from the thrust generated in the front half body 102 toward the disk 14. In this manner, a loss of a piston output at a high hydraulic pressure is reduced.

In the disk brake described above in Japanese Patent Application Laid-open No. 2004-286202, the push rod pushed by the cam rod of the cam mechanism to transmit the pushing force to the piston has a thread portion for adjusting the length so as to be locked against the rotation relative to the cylinder. In this case, when the cam chamber which houses the cam mechanism therein is sealed by a seal provided to the push rod at the time of incorporation of the push rod into the cylinder, the push rod is returned back by the air pressure of the cam chamber even though the push rod is temporarily pressed into the cam chamber. As a result, the fitting for anti-rotation locking between the push rod and the cylinder is sometimes released. If the cylinder is vibrated so as to incorporate a component such as the piston into the cylinder in a state in which the fitting is released, the phase of the push rod and that of the cylinder are shifted from each other. As a result, the component such as the piston cannot be successfully incorporated into the cylinder in some cases. Therefore, for the incorporation of another component after the incorporation of the transmission member, it is necessary to pay full attention not to vibrate the cylinder or to hold the push rod with a jig so that the fitting between the push rod and the cylinder is not released. As a result, the fabrication efficiency of the disk brake is lowered.

On the other hand, according to the disk brake 10 of this embodiment, for inserting the shaft portion 105 of the rear half body 103 included in the push rod 101 into the bottom hole 59 of the cylinder portion 35, the anti-rotation locking portions 130 formed on the push rod 101 are slidably fitted into the axial grooves 72 provided on the cylinder portion 35 side so as to restrict the rotation relative to the cylinder portion 35 before the push rod seal 118 retained in the seal groove 109 of the shaft 105 is located inside the bottom hole 59. Therefore, even when the cam chamber 62 which houses the cam mechanism 92 therein is sealed by the push rod seal 118 provided to the push rod 101 to prevent the push rod 101 from being inserted due to the resistance of the air pressure in the cam chamber 62, the fitting for anti-rotation locking is not released. Therefore, even for the subsequent incorporation of the retaining ring 177, the piston 77 or the like, it is no longer necessary to pay full attention not to vibrate the caliper body 34 or to hold the push rod 101 or the push rod assembly so that the fitting for anti-rotation locking is not released. Thus, the fabrication efficiency can be improved. In addition, the anti-rotation locking portions 130 are fitted into the axial grooves 72 before the push rod seal 118 is inserted into the bottom hole 59. Therefore, the anti-rotation locking portions 130 and the axial grooves 72 have a guiding function for the insertion of the push rod seal 118 into the bottom hole 59. As a result, efficiency in assembly can be improved.

Moreover, the distance between the wall surface 111 of the seal groove 109 on the cam chamber 62 side to the distal end surface 137 of each of the anti-rotation locking portions 130 on the shaft portion 105 side is set to be smaller than the distance from the opening of the hole 60 of the bottom hole 59 to the bottom surface 74 of the slide hole 66, which corresponds to the cylinder opening portion 52 side end of each of the axial grooves 72 provided on the cylinder portion 35 side. Therefore, even when the cam chamber 62 is sealed by the push rod seal 118 provided to the push rod 101 to prevent the push rod 101 from being inserted due to the resistance of the air pressure in the cam chamber 62, the fitting for anti-rotation locking is not released.

Moreover, in the case where the caliper body 34 including the cylinder portion 35 is formed of an aluminum alloy, a length of each of fitted portions between the axial grooves 72 and the anti-rotation locking portions 130 after the assembly of the disk brake 10 is increased by the length of each of the axial projecting tab portions 136. As a result, an area where the axial grooves 72 and the anti-rotation locking portions 130 are held in contact with each other is increased. Therefore, a pressure applied on the surfaces of the axial grooves 72 and the anti-rotation locking portions 130 which are held in contact with each other can be reduced. Thus, abrasion which is likely to occur with the aluminum alloy can be reduced to improve durability. In addition, the length of each of the axial projecting tab portions 136 can be easily changed. Therefore, cost can be prevented from being increased without greatly changing axial layout, that is, only by changing the length of each of the axial projecting tab portions 136 without changing the axial grooves 72 of the cylinder portion 35.

Further, the push rod 101 is axially divided into two bodies, that is, the front half body 102 including the flange portion 122 integrally formed with the shaft portion 120 having the external thread 123 thereon and the rear half body 103 including the shaft portion 105 inserted into the bottom hole 59. Therefore, the loss of the piston output at the high hydraulic pressure can be reduced.

The front half body 102 may be changed as illustrated in FIGS. 9A and 9C. In this variation, the anti-rotation locking portions 130 on both sides further respectively include axial projecting tab portions 200, which project from external end portions of the radial projecting portions 135 on the side opposite to the flange portion 122 toward the shaft portion 120 along the axial direction of the flange portion 122. Here, a distal end surface 201 of each of the axial projecting tab portions 200 on the side opposite to the axial projecting tab portion 136 is along a direction perpendicular to the axis of the front half body 102. On the inner side of the distal end surface 201, a chamfered portion 202 inwardly inclined to be closer to the axial projecting tab portion 136 in the axial direction is formed. Note that, the above-mentioned extending surface portions 131 are formed on the side of the axial projecting portions 135, the axial projecting tab portions 136, and the axial projecting tab portions 200, which is closer to the flange portion 122, in the radial direction of the flange portion 122, whereas the distal end surface portions 132 are formed on the side of the axial projecting portions 135, the axial projecting tab portions 136, and the axial projecting tab portions 200, which is opposite to the flange portion 122. Each of inner surfaces 203 of the axial projecting tab portions 200 on the side opposite to the distal end surface portions 132 is approximately coaxial with the flange portion 122 and forms a cylindrical surface having the same diameter as that of each of the inner surfaces 139.

As a result of locating the pair of anti-rotation locking portions 130 in the pair of axial grooves 72, the rotation of the front half body 102 relative to the cylinder portion 35 is also restricted. At this time, the radial projecting portions 135, the axial projecting tab portions 136, and the axial projecting tab portions 200 can be entirely located in the axial grooves 72. As a result, the length of each of the fitted portions between the axial grooves 72 and the anti-rotation locking portions 130 after the assembly is further increased by the length of each of the axial projecting tab portions 200. As a result, the area on which the axial grooves 72 and the anti-rotation locking portions 130 are held in contact with each other is further increased. Therefore, the pressure applied on the surfaces of the axial grooves 72 and the surfaces of the rotation-stop portions 130 which are held in contact with each other can be further reduced. As a result, the abrasion which is likely to occur with the aluminum alloy can be further reduced to further improve the durability.

Further, the front half body 102 may be changed as illustrated in FIGS. 10A to 10C. In this variation, in contrast to the distal end surface portion 132 of each of the radial projecting portions 135, an outer surface of the axial projecting tab portion 136 of each of the anti-rotation locking portions 130 on both sides is formed as a tapered surface portion 205 which is inclined to be positioned radially inward as being closer to the side opposite to the shaft portion 120 in the axial direction. With the configuration as described above, the insertion of the anti-rotation locking portions 130 into the axial grooves 72 at the time of assembly is facilitated to further improve the efficiency in assembly. Note that, in place of the tapered surface portion 205, a rounded portion (curved chamfered portion) or a flat chamfered portion which is positioned radially inward as being closer to the side opposite to the shaft portion 120 in the axial direction may be formed.

According to the above-mentioned embodiment, a disk brake includes: a caliper for slidably fitting a piston into a cylinder having a cylindrical shape with a closed end and for bringing a pair of pads into contact with a disk by sliding of the piston; a cam mechanism provided in a sealed state in a cam chamber formed in the caliper, the cam mechanism varying an amount of projection of a cam rod by being rotationally driven; a transmission member including: an extending portion located inside the cylinder to extend in a cylinder axial direction, the extending portion including a thread portion for adjusting a length; and an inserted portion inserted into a hole for bringing a cylinder bottom portion and the cam chamber into communication with each other, the transmission member being pushed by the cam rod of the cam mechanism to transmit a pushing force to the piston, in which: the transmission member includes: a flange portion integrally formed with the extending portion; an anti-rotation locking portion formed on an outer circumferential portion of the flange portion, the anti-rotation locking portion being slidably fitted into a fitting area on the cylinder side so as to restrict rotation relative to the cylinder; and a seal groove formed in the inserted portion, the seal groove storing a sealing member for defining the cylinder and the cam chamber; and the anti-rotation locking portion is fitted into the fitting area on the cylinder side before the sealing member is positioned inside the hole when the inserted portion of the transmission member is inserted into the hole. Therefore, for inserting the inserted portion formed to be provided to the transmission member into the hole of the cylinder, the anti-rotation locking portion formed on the transmission member is slidably fitted into the fitting area formed on the cylinder side so as to restrict the rotation relative to the cylinder before the sealing member retained in the seal groove of the inserted portion is located inside the hole. Therefore, even if the cam member which houses the cam mechanism therein is sealed by the sealing member provided to the transmission member to prevent the transmission member from being inserted due to the resistance of the air pressure in the cam chamber, the fitting for anti-rotation locking is not released. Therefore, at the time of subsequent incorporation of the component, it is no longer necessary to pay full attention not to vibrate the cylinder or to hold the transmission member so that the fitting for anti-rotation locking is not released. Thus, the fabrication efficiency can be improved. In addition, the anti-rotation locking portion is fitted into the fitting area before the sealing member is inserted into the hole. Therefore, the anti-rotation locking portion has the guiding function for the insertion of the sealing member into the hole. As a result, the efficiency in assembly can be improved.

Further, a distance from a wall surface of the seal groove on the cam chamber side to an end portion of the anti-rotation locking portion on the inserted portion side is set to be smaller than a distance from an opening of the hole formed in the cylinder bottom portion to an end portion of the fitting area on a cylinder opening portion side, the fitting area being provided on the cylinder side. Therefore, the release of anti-rotation locking is reliably prevented even when the cam chamber is sealed by the sealing member provided to the transmission member to prevent the transmission member from being inserted due to the resistance of the air pressure in the cam chamber.

Further, the cylinder is formed of an aluminum alloy, the fitting area on the cylinder side serves as an axial groove formed in an inner circumferential surface of the cylinder, and the anti-rotation locking portion of the transmission member serves as a projecting tab extending from the outer circumferential portion of the flange portion along the cylinder axial direction to the cylinder bottom portion side to be fitted into the axial groove. Therefore, the length of the fitted portion between the axial groove and the projecting tab after the assembly is increased to increase the area in which the axial groove and the projecting tab are held in contact. Therefore, the pressure applied to the surface of the axial groove and that of the projecting tab which are held into contact with each other can be reduced. As a result, the abrasion which is likely to occur with the aluminum alloy can be reduced to improve the durability.

Further, the transmission member is axially divided into two bodies respectively corresponding to a front half body including the flange portion integrally molded with the extending portion and a rear half body including the inserted portion. Therefore, the loss of the piston output at the high hydraulic pressure can be reduced.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2009-200990, filed on Aug. 31, 2009. The entire disclosure of Japanese Patent Application No. 2009-200990, filed on Aug. 31, 2009 including specification, claims, drawings and summary is incorporated herein by reference in its entirety.

What is claimed is:

1. A disk brake, comprising:
   a caliper for slidably fitting a piston into a cylinder having a cylindrical shape with a closed end and for bringing a pair of pads into contact with a disk by sliding of the piston;
   a cam mechanism provided in a sealed state in a cam chamber formed in the caliper, the cam mechanism varying an amount of projection of a cam rod by being rotationally driven;
   a transmission member including: an extending portion located inside the cylinder and to extend in an axial direction of the cylinder, the extending portion including a thread portion for adjusting a length; and an inserted portion inserted into a hole for bringing a bottom portion of the cylinder and the cam chamber into communication with each other, the transmission member being pushed by the cam rod of the cam mechanism to transmit a pushing force to the piston;
   wherein:
   the transmission member includes: a flange portion integrally formed with the extending portion; an anti-rotation locking portion formed on an outer circumferential portion of the flange portion, the anti-rotation locking portion being slidably fitted into a fitting area on the cylinder so as to restrict rotation relative to the cylinder; and a seal groove formed in the inserted portion, the seal groove storing a sealing member therein for defining the cylinder and the cam chamber and sealing the cam chamber; and
   the anti-rotation locking portion is formed at a position allowing the anti-rotation locking portion to be fitted into the fitting area on the cylinder before the sealing member is positioned inside the hole when the inserted portion of the transmission member is inserted into the hole.

2. A disk brake according to claim 1, wherein a distance from a wall surface of the seal groove on the cam chamber side to an end portion of the anti-rotation locking portion on the inserted portion side is set to be smaller than a distance from an opening of the hole formed in the bottom portion of the cylinder to an end portion of the fitting area of the cylinder on a cylinder opening portion side.

3. A disk brake according to claim 1, wherein:
   the fitting area on the cylinder serves as an axial groove formed in an inner circumferential surface of the cylinder; and
   the anti-rotation locking portion of the transmission member serves as a projecting tab extending from the outer circumferential portion of the flange portion along the axial direction of the cylinder toward the bottom portion of the cylinder to be fitted into the axial groove.

4. A disk brake according to claim 3, wherein the cylinder is formed of an aluminum alloy.

5. A disk brake according to claim 3, wherein the projecting tab is formed to extend toward the inserted portion side.

6. A disk brake according to claim 1, wherein the transmission member is axially divided into two bodies respectively corresponding to a front half body including the extending portion with the flange portion integrally molded with the extending portion and a rear half body including the inserted portion.

7. A disk brake according to claim 6, wherein the front half body and the rear half body are combined with a biasing member for pressing the front half body against the rear half body and a cover member for supporting the biasing member, to form a cartridge.

8. A disk brake according to claim 1, wherein a hydraulic pressure is introduced into the cylinder, and the piston slides by the introduced hydraulic pressure.

9. A disk brake according to claim 8, wherein a clutch member for abutting against an inner surface of the piston so as to be separatable from the piston is provided between the transmission member and the piston.

10. A disk brake, comprising:
    a caliper for slidably fitting a piston into a cylinder having a cylindrical shape with a closed end and for bringing a pair of pads into contact with a disk by sliding of the piston;
    a cam mechanism provided in a sealed cam chamber formed in the caliper, the cam mechanism generating a thrust by being rotationally driven; and
    a transmission member including: an extending portion located inside the cylinder to extend in an axial direction of the cylinder; and an inserted portion inserted into a hole for bringing a bottom portion of the cylinder and the cam chamber into communication with each other, the transmission member transmitting the thrust of the cam chamber to the piston, wherein:
    the transmission member includes: a flange portion formed integrally with one of the extending portion and the inserted portion to be provided to an area located inside the cylinder; an anti-rotation locking portion formed on an outer circumference of the flange portion, the anti-rotation locking portion being slidably fitted into a fitting area on the cylinder so as to restrict rotation relative to the cylinder; and a seal groove for storing a sealing member for defining the cylinder and the cam chamber and sealing the cam chamber, the seal groove being formed in the inserted portion; and the anti-rotation locking portion is formed so that a distance (L1) from an end portion of the anti-rotation locking portion on the inserted portion side to a wall surface of the seal groove on the cam chamber side is smaller than a distance (L2) from an opening of the hole formed in the bottom portion of the cylinder to an end portion of the fitting area of the cylinder on a cylinder opening portion side.

11. A disk brake according to claim 10, wherein:

the fitting area of the cylinder serves as an axial groove formed in an inner circumferential surface of the cylinder; and the anti-rotation locking portion of the transmission member serves as a projecting tab extending from the outer circumference of the flange portion along the axial direction of the cylinder toward the bottom portion of the cylinder to be fitted into the axial groove.

12. A disk brake according to claim 11, wherein the cylinder is formed of an aluminum alloy.

13. A disk brake according to claim 11, wherein the projecting tab is formed to extend to the inserted portion side.

14. A disk brake according to claim 10, wherein the transmission member is axially divided into two bodies respectively corresponding to a front half body including the extending portion with the flange portion integrally molded with the extending portion and a rear half body including the inserted portion.

15. A disk brake according to claim 14, wherein the front half body and the rear half body are combined with a biasing member for pressing the front half body against the rear half body and a cover member for supporting the biasing member, to form a cartridge.

16. A disk brake according to claim 10, wherein a hydraulic pressure is introduced into the cylinder, and the piston slides by the introduced hydraulic pressure.

17. A disk brake according to claim 16, wherein a clutch member for abutting against an inner surface of the piston so as to be separatable from the piston is provided between the transmission member and the piston.

18. A disk brake, comprising:

a caliper for slidably fitting a piston into a cylinder having a cylindrical shape with a closed end, into which a hydraulic pressure is introduced, and for bringing a pair of pads into contact with a disk by the sliding of the piston;

a cam mechanism provided in a sealed cam chamber formed in the caliper, the cam mechanism generating a thrust by being rotationally driven;

a push rod including: an extending portion located inside the cylinder and extending in an axial direction of the cylinder, the extending portion including a thread portion formed thereon; and an inserted portion inserted into a hole for bringing a bottom portion of the cylinder and the cam chamber into communication with each other, the push rod transmitting the thrust of the cam mechanism to the piston; and a clutch member provided between the push rod and the piston for abutting against an inner surface of the piston so as to be separatable from the piston, wherein:

the push rod includes: a flange portion integrally formed with the extending portion to be provided to an area located inside the cylinder; a projecting tab slidably fitted into an axial groove formed in an inner circumferential surface of the cylinder so as to restrict rotation relative to the cylinder, the projecting tab being formed on an outer circumference of the flange portion; and a seal groove formed in the inserted portion for storing a sealing member for defining the cylinder and the cam chamber and sealing the cam chamber; and the projecting tab axially extends from the flange portion toward the cam chamber, and a distance (L1) from an end portion of the projecting tab on the inserted portion side to a wall surface of the seal groove on the cam chamber side is smaller than a distance (L2) from an opening of the hole in the bottom portion of the cylinder to an end portion of the axial groove of the cylinder on a cylinder opening side.

19. A disk brake according to claim 18, wherein the cylinder is formed of an aluminum alloy.

20. A disk brake according to claim 18, wherein the transmission member is axially divided into two bodies respectively corresponding to a front half body including the extending portion with the flange portion integrally molded with the extending portion and a rear half body including the inserted portion, and wherein the front half body and the rear half body are combined with a biasing member for pressing the front half body against the rear half body and a cover member for supporting the biasing member, to form a cartridge.

* * * * *